July 4, 1933.  R. R. WORRALL  1,917,004
CONVEYER SYSTEM
Filed April 2, 1931   3 Sheets-Sheet 1

INVENTOR:
Roy R. Worrall
HIS ATTORNEYS

July 4, 1933.  R. R. WORRALL  1,917,004
CONVEYER SYSTEM
Filed April 2, 1931  3 Sheets-Sheet 2
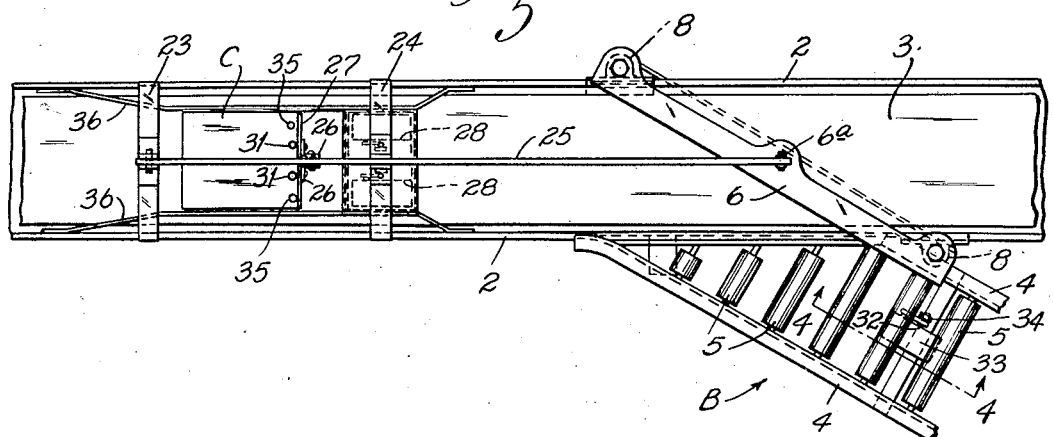
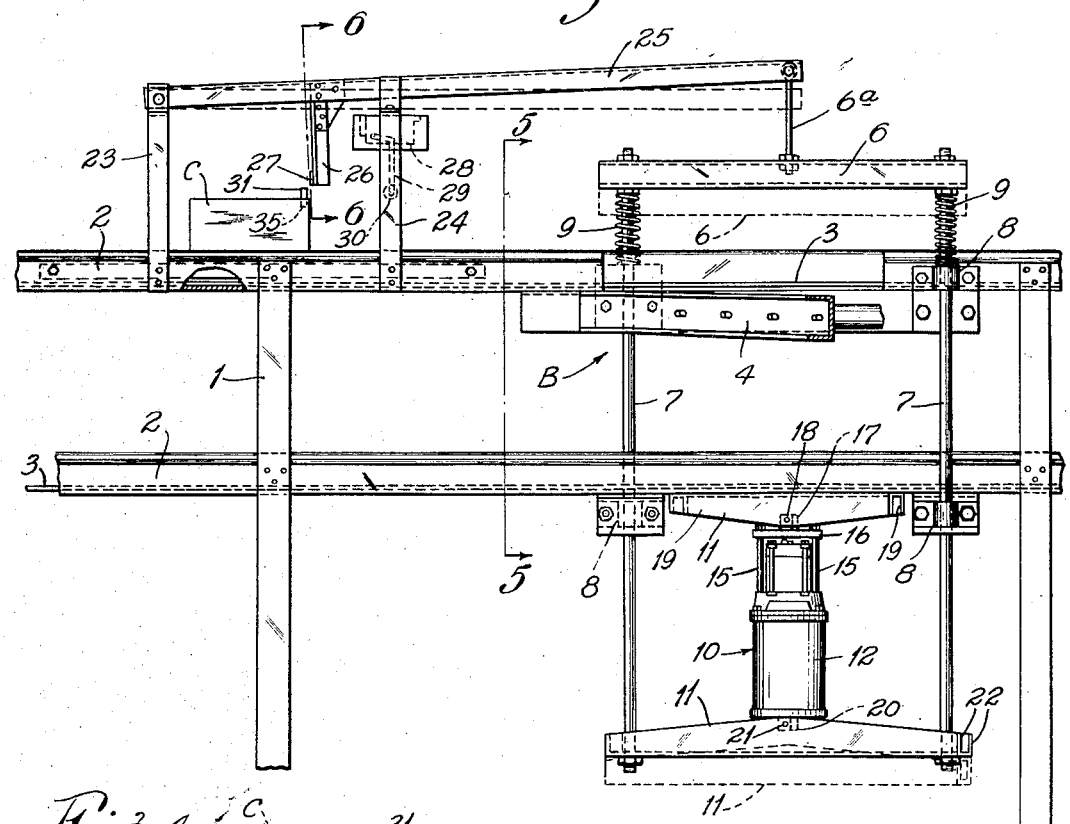
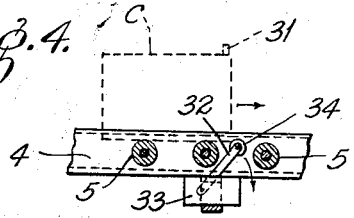
INVENTOR:
Roy R. Worrall
HIS ATTORNEYS July 4, 1933.  R. R. WORRALL  1,917,004
CONVEYER SYSTEM
Filed April 2, 1931   3 Sheets-Sheet 3

INVENTOR:
Roy R. Worrall
by Cornett Bennett Gravil
HIS ATTORNEYS

Patented July 4, 1933

1,917,004

UNITED STATES PATENT OFFICE

ROY R. WORRALL, OF WEBSTER GROVES, MISSOURI, ASSIGNOR TO ALVEY MANUFACTURING COMPANY, OF ST. LOUIS, MISSOURI, A CORPORATION OF MISSOURI

CONVEYER SYSTEM

Application filed April 2, 1931. Serial No. 527,069.

My invention relates to conveyer systems of the type comprising one line having a plurality of other lines communicating therewith wherein articles on the one line will be selectively delivered to the proper one of the other lines; and the principal object of the present invention is to equip such a system with means for automatically deflecting articles from the one line onto one of the other lines selectively.

My invention consists principally in means under the control of electrical devices actuated by articles on a conveyer for selectively delivering such articles therefrom. It also consists in the deflecting mechanism and in the parts, combinations and arrangements of parts hereinafter described and claimed.

Figure 1:
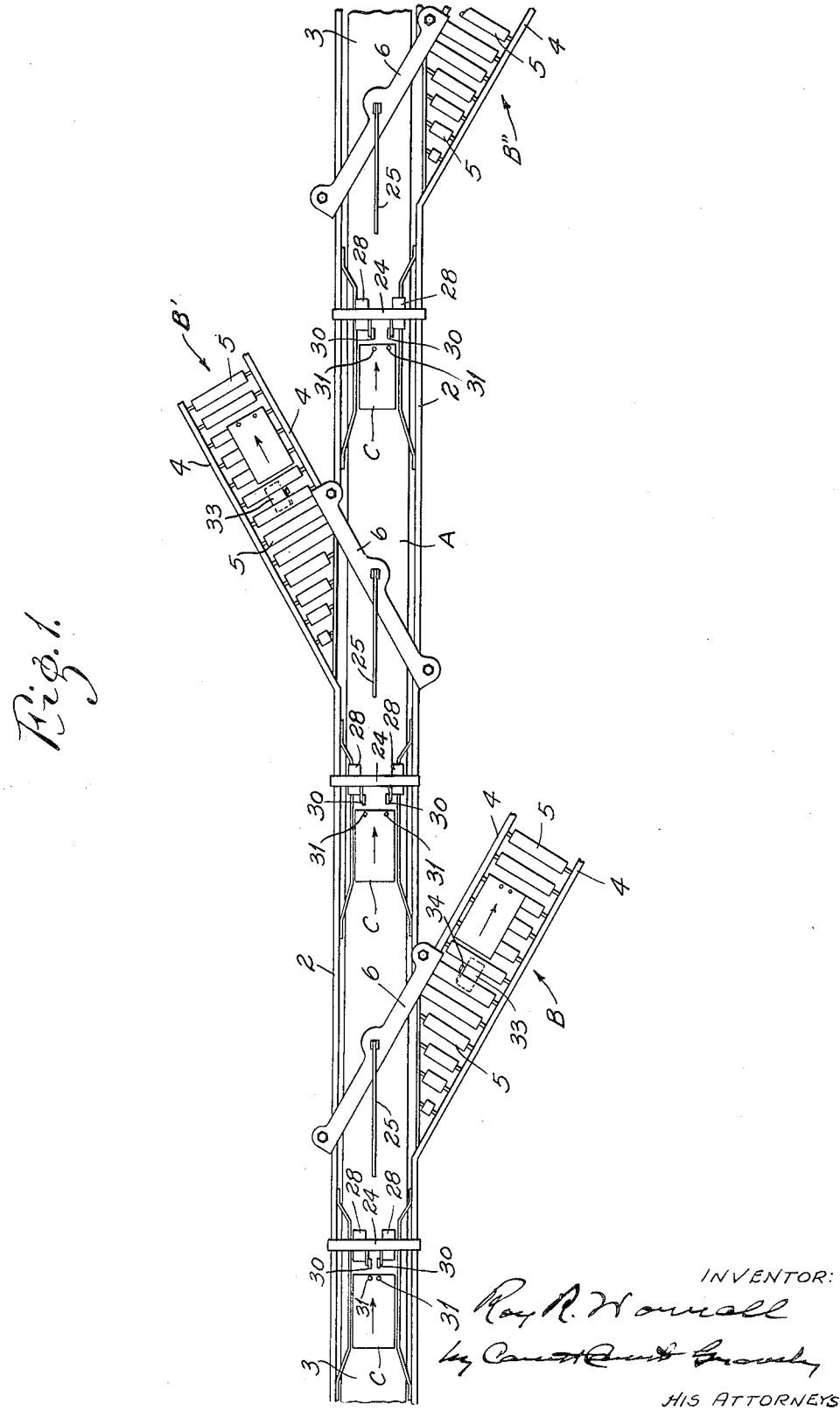
Figure 5:
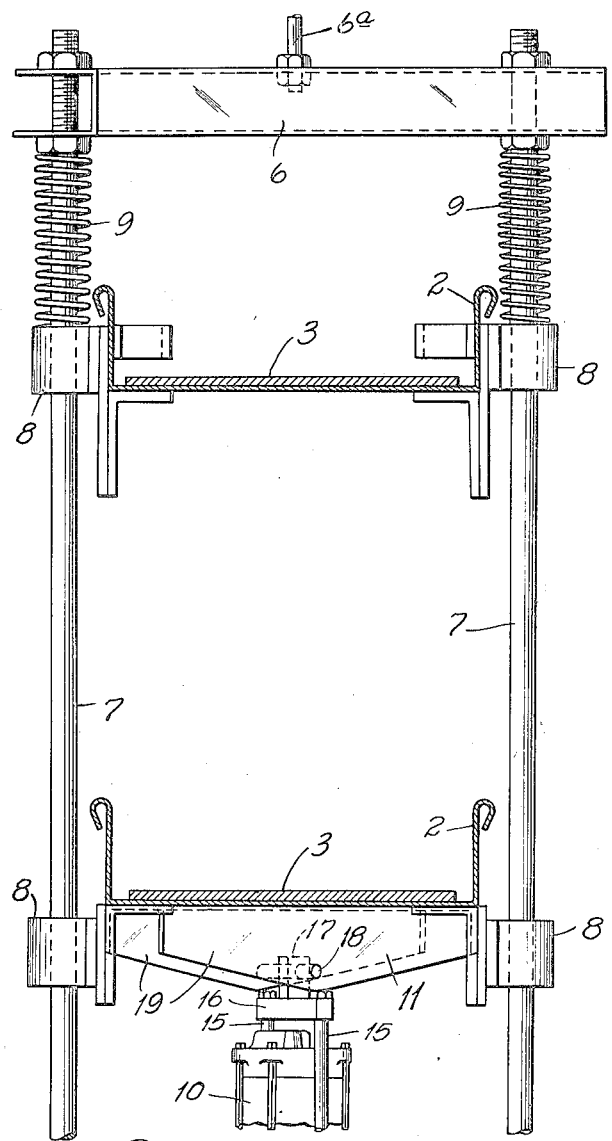
Figure 7:
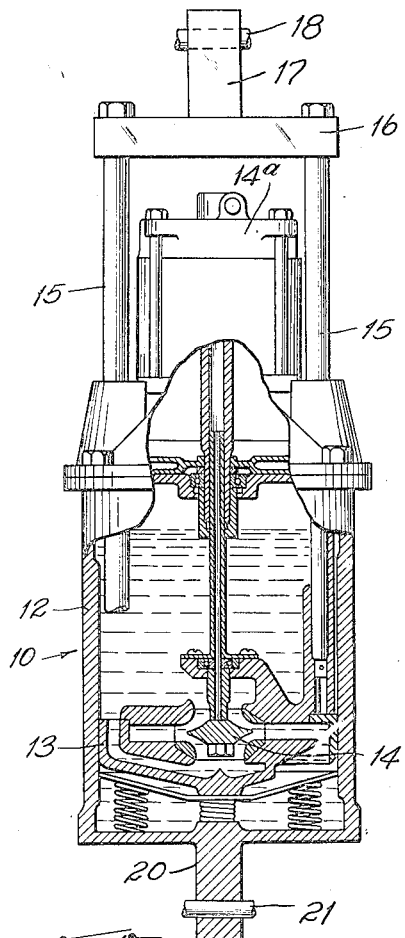
Figure 6:
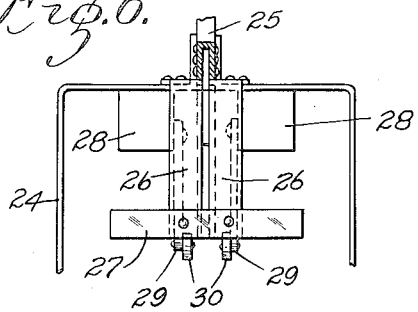
Figure 8:
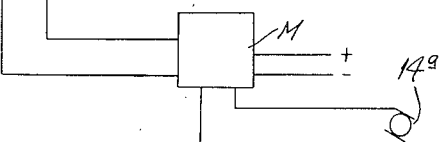

In the accompanying drawings, which form part of this specification, and wherein like reference symbols refer to like parts wherever they occur, Fig. 1 is a plan view with parts broken away, of a conveyer system showing a main line having branch lines communicating therewith and equipped with deflecting devices embodying my invention, Fig. 2 is a detail plan view of one of the deflecting devices which is provided at the junction of the main line and each branch line, Fig. 3 is an elevation of the construction shown in Fig. 2, Fig. 4 is a view along the line 4—4 in Fig. 2, Fig. 5 is a view along the line 5—5 in Fig. 3, Fig. 6 is a view along the line 6—6 in Fig. 3, Fig. 7 is a detail front view, with parts broken away, of the power means used for operating the deflecting devices, and Fig. 8 is diagrammatic view of the wiring used with each deflecting device.

In the construction illustrated, the main conveyer A of a conveyer system comprises upright members 1, upper and lower side frame members 2 mounted thereon, and a continuous article carrying belt 3 traveling between said side frame members and operatively connected to a suitable source of power (not shown).

Branch conveyers B, B' and B" of the gravity type extend from the main line preferably at about 45° to the direction of travel thereof indicated by arrows. Each branch line comprises side frames 4 supporting a bed of rollers 5 adapted to receive articles from the carrying belt 3 of the main line. While I have shown only three branch lines it is obvious that any number of branch lines may be used without departing from my invention.

The shifting or deflecting devices located at each branch line and adapted to deflect an article from the main line onto the branch line are all of similar construction. Each comprises a deflecting arm located above the main line and extending diagonally across it and movable vertically so that in its upper position articles will pass thereunder and in its lower position articles will engage it and be deflected thereby onto the branch line. The deflecting arm 6 is mounted at each end on rods 7 located on each side of the main line, respectively, and slidably mounted in two brackets 8 which are mounted on the upper and lower side frame members, respectively. The deflecting arm 6 is normally held in its upper position by means of a coil spring 9 surrounding each rod and interposed between each upper bracket and the deflecting arm.

Means for effecting movement of the deflecting arm 6 comprises a thrusting device 10 of standard design, and commonly known commercially as an operator which is interposed between two channel members 11, one being mounted on the under side of the lower side frame members of the main line and the other being mounted on the lower ends of the slidably mounted rods 7. The operator comprises a cylindrical casing 12 and a piston 13 therein which is provided with a centrifugal impeller pump 14 that is driven by a motor 14a mounted in the top portion of the casing. By means of the centrifugal impeller pump 14, oil in the casing may be forced through either the top or bottom portion of said cylinder with a resultant raising and lowering of the piston and the thrust obtained thereby is transmitted through two piston rods 15 to a cross member 16 having provided thereon an upstanding thrusting arm 17. The upper end of the operator thrusting arm 17 is hinged to a pin 18 extending between the flanges 19 of the upper channel member 11; and the bottom of the operator casing 12 is provided with a lug 20 having an opening for receiving another pin 21 extending between the flanges 22 of the lower channel member 11.

Straddling the main line a suitable distance forwardly from the junction of each branch line and mounted on the upper side frame members 2 thereof is an inverted U-member 23 of sufficient size to allow articles to pass thereunder; and a similar U-shaped member 24 is also mounted on the upper side frame members intermediate the first mentioned U-member 23 and the deflecting arm 6. An arm 25 extending longitudinally with and above the main line is hinged at one end to the top of the first mentioned U-member 23 and has its other end hinged to the top of a short rod 6a projecting upwardly from the top of the deflecting arm 6. Extending downwardly from said arm 25 are two angles 26, one mounted on each side thereof, respectively, and secured to the lower ends of said angles 26 is a transverse blocking member 27 located forwardly from the deflecting mechanism so as to block articles to prevent them from reaching the deflecting mechanism when it has been set in a deflecting position as shown by the dotted lines in Fig. 3.

Mounted on the intermediate U-member 24 are two electric switches 28 having the lower ends of their actuating levers 29 provided with rollers 30 for engaging projections on pins 31 projecting from the top of articles being conveyed on the main line. The switches 28, which are normally open, are connected in series with a magnetic switch M, of standard design, which is operatively coupled to the operator motor 14a to start the same. An actuating lever 32 of a third switch 33, located below the branch line a slight distance from its junction with the main line, extends upwardly between two of the branch line rollers 5 and slightly above the carrying surface thereof so as to be engaged by the bottom of an article riding thereon. Preferably, the upper end of the actuating lever is provided with a small roller 34 similar to those of the other actuating levers to insure smooth operation thereof. The switch 33, which is normally closed, is coupled to the controlling circuit of the magnetic switch M in such manner that when it is opened it will interrupt the flow of current through the magnetic coil of the switch M thereby releasing the contacts thereof to stop the operator motor.

Selectivity of the system is controlled by means of the switches provided on the main line for controlling the various deflecting devices, and the projections 31 extending from the articles being conveyed on the main line. By arranging the switches in different positions at each branch line it is obvious that by setting the pins on a particular article in a definite predetermined location it is possible to predetermine the path of an article. Preferably, I use with my system, article carrying cases C having a series of holes 35 provided on their top forward ends for receiving the actuating pins 31; and hence it is possible to select a particular deflecting mechanism by merely placing the pins in holes corresponding to the position of the switch actuating levers for that particular branch line. In order to properly position a case before reaching each branch line, two oppositely disposed inwardly extending somewhat resilient guiding arms 36 are provided on the main line in such position as to cause cases to be guided between them and properly position the case with respect to the actuating levers of the switches for that line.

The operation of the system is as follows: Assuming that a case is to be deflected onto a particular branch line, pins 31 are placed in the proper holes of said case for engaging the two actuating levers 29 of the switches 28 controlling that particular branch line. When the case reaches the particular branch line, the pins 31 thereon move against the actuating levers of the normally open switches and close them simultaneously thereby closing the circuit of the magnetic coil of the switch M. Thus said coil is energized, the switch M is closed and the operator motor 14a is started. The thrust action of the operator then forces the deflecting arm 6 downwardly against the action of the coil springs 9 into the path of the moving case which is deflected thereby onto the branch conveyer. After the case has been deflected onto the branch conveyer, it engages the actuating lever 32 of the normally closed switch 33 to open the same and thereby deenergizes the coil of the magnetic switch M so as to open said switch and thereby stop the operator motor 14a. The coil springs 9 then force the deflecting arm upwardly to clear the main conveyer line and to move the operator 10 back into its contracted position. At the same time that the deflecting arm 6 moves into its deflecting position, the longitudinally disposed arm 25 located at the top of the conveyer swings downwardly thereby placing the transverse blocking member 27 in a position to engage and block a following article and prevent the same from being deflected by, or interfering with, the operation of the deflecting mechanism.

While I have shown the main line as comprising a power belt conveyer and the branch lines as gravity conveyers, it is obvious that other types of conveyers could be used with my invention. Furthermore, other power means for operating the deflecting arms such as, for example, an electrical solenoid or an ordinary motor rigged up with cranks or the like to obtain a straight line motion, could be used and hence I do not wish to be limited in any way to the precise construction shown and described. It is also obvious, that instead of using two switches for controlling the deflecting devices, a single switch could be used; however, it is preferable to use two or more switches when there are a large number of branch lines leading from a main line, as the various position combinations thereof are much greater.

What I claim is:

1. The combination of a conveyer, electrically operated means for deflecting an article therefrom, means for controlling said deflecting means comprising an electrical circuit, electric switches connected in series in said circuit and having actuating levers in position to be actuated solely by projections having a predetermined location on an article riding on said conveyer.

2. The combination of a conveyer, electrically operated means for deflecting an article therefrom, an electrical circuit for controlling said deflecting means, a plurality of switches connected in series in said circuit having actuating levers in position to be actuated solely by adjustably mounted pins having a predetermined location on an article riding on said conveyer.

3. The combination of a conveyer, a plurality of deflecting devices for deflecting articles therefrom, separate means controlling each deflecting device and each separate controlling means comprising an electrical circuit, a set of switches connected in series in said circuit and having actuating levers in position to be actuated by an article riding on said conveyer, each of said sets of actuating levers being arranged in a different position from the others with respect to the line of travel of articles riding on said conveyer so as to be responsive to a set of projections on an article in one position only.

4. The combination of a conveyer, a plurality of deflecting devices for deflecting articles therefrom, separate means for controlling each deflecting means selectively, each separate controlling means comprising a plurality of electric switches in series, an actuating lever for each switch, each plurality of actuating levers being in position to be actuated by projections having a predetermined location on an article riding on said conveyer and each plurality of actuating levers being arranged in different positions from the others so that each deflecting device is controlled solely by a different arrangement of projections on an article.

5. A conveyer system comprising a plurality of conveyers, means for deflecting an article on one conveyer to another, means for controlling said deflecting means comprising an electrical control circuit, a plurality of switches in series in said circuit having actuating levers in position to be actuated solely by projections having a predetermined location on an article riding on the one conveyer for starting the operation of said deflecting means and another switch in said circuit having its actuating lever in position to be actuated by an article that has been deflected to the other conveyer for stopping the operation of said deflecting means.

6. A conveyer system comprising a conveyer and another conveyer communicating therewith, means for deflecting an article riding on one conveyer to the other, an electric motor operatively coupled to said deflecting means, an electric circuit controlling said motor, a plurality of normally open switches connected in series in said circuit, actuating levers for said switches, the actuating levers of said switches being in position to be actuated by an article on the one conveyer, another normally closed switch in said circuit, and an actuating lever therefor in position to be actuated by an article deflected to the other conveyer.

7. A conveyer system comprising a main conveyer and a branch conveyer leading therefrom, means for deflecting an article riding on the main conveyer to the branch conveyer, electrical operating means operatively connected to said deflecting means, an electric circuit controlling said operating means, a magnetic switch operatively coupled in said circuit, a plurality of normally open switches connected in series and operatively coupled to said magnetic switch, actuating levers extending from said limit switches having their ends in position to be actuated by an article riding on the main conveyer, a normally closed switch operatively coupled to the magnetic coil of said magnetic switch and an actuating lever for said normally closed switch in position to be actuated by an article deflected onto the branch conveyer.

8. A conveyer system comprising a main conveyer, branch conveyers leading therefrom, a deflecting device located at each branch conveyer for deflecting an article from said main conveyer to said branch conveyer, separate means controlling each deflecting device comprising a plurality of electrical switches connected in series and having actuating levers in position to be actuated by an article riding on the main conveyer, each plurality of switch actuating levers being arranged in different positions from the others with respect to the line of travel of articles riding on the main conveyer so that each is responsive to projections having a predetermined location on an article riding on the main line.

9. The combination of a conveyer, a movably mounted arm located above and extending diagonally across said conveyer, resilient means for holding said arm normally above the path of an article riding on said conveyer, power means for acting against said resilient means and lowering said arm into the path of an article riding onto said conveyer to deflect an article therefrom and means for controlling said power means controlled by articles on said conveyer.

10. The combination of a conveyer, a movably mounted arm located above said conveyer and extending diagonally across the same, resilient means for normally holding said arm above the path of an article riding on said conveyer, an electrically operated pump driven thrusting device operably connected to said arm for moving said arm into the path of an article riding on said conveyer to deflect said article therefrom, and means under the control of articles on said conveyer for actuating said thrusting device.

11. The combination of a conveyer, means for deflecting an article therefrom, a pivotally mounted arm operatively connected to said deflecting means for conjoint movement therewith and a blocking member extending from said arm for moving into the path of an article riding on said conveyer for blocking an article before reaching said deflecting means.

12. The combination of a conveyer, a deflecting arm extending diagonally across said conveyer, means for moving said arm into the path of an article riding on said conveyer for deflecting said article therefrom, an arm extending longitudinally of said conveyer and having its one end hinged to a member extending above said conveyer and having its other end operatively connected to said diagonal deflecting arm and a projection extending downwardly from said arm for blocking an article before reaching said deflecting arm when said deflecting arm is in its deflecting position.

13. The combination of a conveyer, a rod slidably mounted to one side of said conveyer, a deflecting arm mounted on said rod above said conveyer and extending diagonally across said conveyer, means for normally holding said arm above the path of an article riding on said conveyer, means operatively connected to said rod and said conveyer for moving said arm into the path of an article riding on said conveyer to deflect said article therefrom, a pivotally mounted arm extending longitudinally of said conveyer and having its end hinged to a projection extending from said deflecting arm, and a projection extending downwardly from said longitudinal arm for blocking an article before reaching said deflector arm.

14. The combination of a conveyer, means for deflecting an article therefrom, means for controlling said deflecting means comprising a switch actuating lever in position to be actuated solely by a projection having a predetermined location on an article riding on said conveyer, blocking means operatively connected to said deflecting means for engaging a projection extending from an article in any position to block said article when the deflecting means has been set for deflecting an article before it reaches the switch actuating levers.

15. The combination of a conveyer, electrically actuated means for deflecting an article therefrom, means for controlling said deflecting means comprising an electric circuit, electric switches connected in series in said circuit and having actuating members in position to be actuated by articles riding on said conveyer.

Signed at St. Louis, Missouri, this 27th day of March 1931.

ROY R. WORRALL.